United States Patent
Yu

(10) Patent No.: US 8,176,037 B2
(45) Date of Patent: May 8, 2012

(54) SYSTEM AND METHOD FOR SQL QUERY LOAD BALANCING

(75) Inventor: Patrick Yu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 12/619,540

(22) Filed: Nov. 16, 2009

(65) Prior Publication Data

US 2011/0119251 A1    May 19, 2011

(51) Int. Cl.
*G06F 17/30* (2006.01)
(52) U.S. Cl. ........................................ 707/713
(58) Field of Classification Search .............. 707/3, 722, 707/713; 709/223
See application file for complete search history.

(56) References Cited

U.S. PATENT DOCUMENTS

| | | | |
|---|---|---|---|
| 7,464,070 B2 | 12/2008 | Yagawa | 707/2 |
| 2009/0228446 A1* | 9/2009 | Anzai et al. | 707/3 |
| 2010/0161593 A1* | 6/2010 | Paulsen et al. | 707/722 |

* cited by examiner

*Primary Examiner* — Etienne Leroux
(74) *Attorney, Agent, or Firm* — Baker Botts L.L.P.

(57) ABSTRACT

Systems and methods for SQL query load balancing are disclosed. A method may include establishing a ranking scheme, assigning a rank to an SQL query from the ranking scheme based on a plurality of rank assignment parameters, determining a threshold rank based on a plurality of gathered operational characteristics, comparing the assigned rank to the threshold rank, and, if the assigned rank is greater than the threshold rank, executing the SQL query on a database server. Otherwise, if the assigned rank is not greater than the threshold rank, executing the SQL query on a centralized storage system.

4 Claims, 3 Drawing Sheets

| RATIO R | RANK |
|---|---|
| 0.1 < R <= 1 | 8 |
| 0.01 < R <= 0.1 | 7 |
| 0.001 < R <= 0.01 | 6 |
| 0.0001 < R <= 0.001 | 5 |
| 0.00001 < R <= 0.0001 | 4 |
| 0.000001 < R <= 0.00001 | 3 |
| 0.0000001 < R <= 0.000001 | 2 |
| R < 0.0000001 | 1 |

| N = NUMBER OF OUTER QUERY RESULTS | RANK |
|---|---|
| 1 < N <= 10 | 8 |
| 10 < N <= 100 | 7 |
| 100 < N <= 1,000 | 6 |
| 1,000 < N <= 10,000 | 5 |
| 10,000 < N <= 100,000 | 4 |
| 100,000 < N <= 10,000,000 | 3 |
| 10,000,000 < N <= 100,000,000 | 2 |
| N > 100,000,000 | 1 |

SYSTEM AND METHOD FOR SQL QUERY LOAD BALANCING

TECHNICAL FIELD

The present disclosure relates in general to information handling systems, and more particularly to load balancing SQL query execution on booted information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software component(s) that may be configured to process, store, and communicate information and may include one or more computer systems, data storage systems, and networking systems.

As information handling systems become more complex and the number of data queries they are required to handle increase, many information handling systems are implemented in architectures in which the responsibilities for handling those data queries are diversified. This diversification, however, requires robust management tools to effectively balance data handling responsibilities among other competing needs. Additionally, the operational context in which an information handling system operates changes frequently, corresponding to an increase in the difficulty of effectively managing the allocation of data processing responsibilities.

SUMMARY

In accordance with the teachings of the present disclosure, the disadvantages and problems associated with load balancing the execution of SQL queries in an information handling system may be improved, reduced, or eliminated.

In accordance with one embodiment of the present disclosure, a method for allocating the execution of a SQL query in a system comprising a database server and a storage system communicatively coupled to the database server via a communication network is provided. The method may include establishing a ranking scheme comprising a plurality of rank values, assigning a first rank from the plurality of rank values to the SQL query, determining a threshold rank from the plurality of rank values, comparing the first rank to the threshold rank, if the first rank is greater than the threshold rank, communicating the SQL query to the database server for execution, and if the first rank is not greater than the threshold rank, communicating the SQL query to the storage system for execution.

In accordance with another embodiment of the present disclosure, a system for allocating the execution of an SQL query between a database server and a storage system communicatively coupled to the database server via a communication network is provided. The system may include a database server, configured to establish a ranking scheme comprising a plurality of rank values, assign a first rank from the plurality of rank values to the SQL query, determine a threshold rank from the plurality of rank values, compare the first rank to the threshold rank, if the first rank is greater than the threshold rank, communicate the SQL query to the database server for execution, and if the first rank is not greater than the threshold rank, communicate the SQL query to the storage system for execution.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional component(s) or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware component(s).

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figures 1, 4, 5:
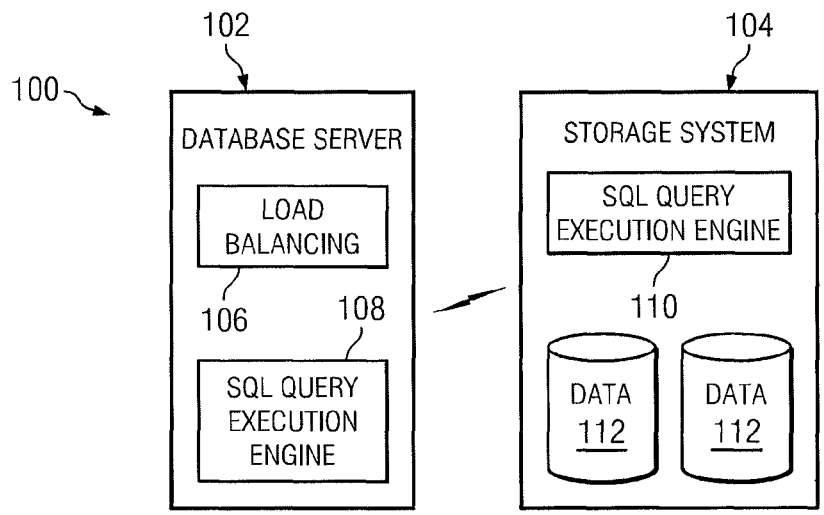
FIG. 1 illustrates an information handling system for load balancing SQL query execution between a database server and a centralized storage system communicatively coupled to database server, in accordance with certain embodiments of the present disclosure.
FIG. 4 illustrates an example ranking scheme for load balancing SQL queries between database server and storage system, in accordance with certain embodiments of the present disclosure.
FIG. 5 illustrates an example ranking scheme for load balancing SQL queries between database server and storage system, in accordance with certain embodiments of the present disclosure.

FIG. 1 illustrates an information handling system 100 for load balancing SQL query execution between a database server 102 and a centralized storage system 104 communicatively coupled to database server 102, in accordance with certain embodiments of the present disclosure.

Database server 102 may comprise any suitable type of information handling system(s) and in certain embodiments, database server 102 may be a specialized and/or dedicated server for performing database operations. In the same or alternative embodiments, database server 102 may comprise a peripheral device, such as a printer, sound card, speakers, monitor, keyboard, pointing device, microphone, scanner, and/or "dummy" terminal, for example. Database server 102 may include one or more modules implemented as hardware components or stored on computer-readable media and executable by a processor, including load balancing module 106 and SQL query execution engine 108. Load balancing module 106 may be generally operable to balance the execution of SQL queries received at database server 102 based on certain operational characteristics of information handling system 100, as described in more detail below with reference to FIGS. 2-5.

Storage system 104 may include one or more modules implemented as hardware components or stored on computer-readable media and executable by a processor, including SQL query execution engine 110, as well as one or more databases 112 containing the data to be searched by an SQL query received by database server 102 or storage system 104, as described in more detail below with reference to FIGS. 2-5. In operation, storage system 104 may be used as a central repository for data in databases 112 for access by multiple database servers 102 and/or clients seeking access to data.

Database server 102 may be communicatively coupled to storage system 104 via any appropriate communication path, including wired or wireless paths configured to communicate via an appropriate protocol, such as TCP/IP. For ease of description, the components of database server 102 and storage system 104 are depicted as residing on one machine or another. However, these components may be present in more or fewer machines than depicted in FIG. 1.

In operation, a user of information handling system 100 may request data from database server 102. The user may be an end-user requesting data, such as a request to render a web page, or another component of information handling system 100, such as an application server requesting data for use in running the appropriate application. In some embodiments, the request for data may be made in the form of a structured query language ("SQL") request. SQL is a method of requesting data from a relational database such as database 112 of storage system 104. In a SQL query, a user may specify which tables of database 112 contain the desired data according to specified criteria, and which subset of that data the user desires to see or use. SQL queries may require data from a single table of database 112 (a "single table query") or from multiple tables of database 112 (a "multi-table query"). A multi-table query may require the database management system of database 112 to read several tables related to one another in order to fulfill the query. These nested queries may be referred to as "outer loop" and "inner loop" queries. The outer loop query may specify the first table to which database 112 may look in order to satisfy the multi-loop query, and any subsequent inner loop queries may specify which tables database 112 may need to look to after performing the outer loop query. In some embodiments, each nested query of a multi-loop query may be treated separately in some respects, as described in more detail below with reference to FIGS. 3-5.

After receiving the SQL query, load balancing module 106 of database server 102 may then make a determination as to whether the SQL query is most appropriately executed on database server 102 or storage system 104, as described in more detail below with reference to FIGS. 2-5. After determining the appropriate execution location, the SQL query may then be executed on database server 102 or communicated to storage system 104 for execution, whichever was deemed appropriate by load balancing module 106. Once the SQL query has been executed by storage system 104 (if required), the results are returned to database server 102.

In current information handling system configurations, the functionality of database server 102 may be limited to searching for the data required by the SQL query in a data cache within database server 102. If the data is not found in the data cache, database server 102 may then have to retrieve the data from databases 112 of storage system 104. However, if storage system 104 does not have the ability to execute the SQL query locally, then storage system 104 must send the raw data from databases 112 to database server 102 for processing. If the SQL query requires a large amount of data, this can create a bottleneck in the communication link between database server 102 and storage system 104. Part of this problem may be solved by moving some of the SQL query execution functionality to storage system 104, depicted in FIG. 1 as SQL query execution engine 110.

However, performance and management issues continue to exist in this configuration. Information handling system 100 must continue to monitor the operating characteristics of database server 102, storage system 104, and the communication link between them in order to ensure optimal functionality. For instance, any benefit received in processing an SQL query at SQL query execution engine 110 of storage system 104 may be undermined by sending too many requests for processing at storage system 104. Bottleneck issues between database server 102 and storage system 104 may be minimized or eliminated through appropriate load balancing by continuously monitoring operating characteristics of information handling system 100 and dynamically adjusting the criteria for deciding where an SQL query may by executed, as described in more detail below with reference to FIGS. 2-5.

Figure 2:
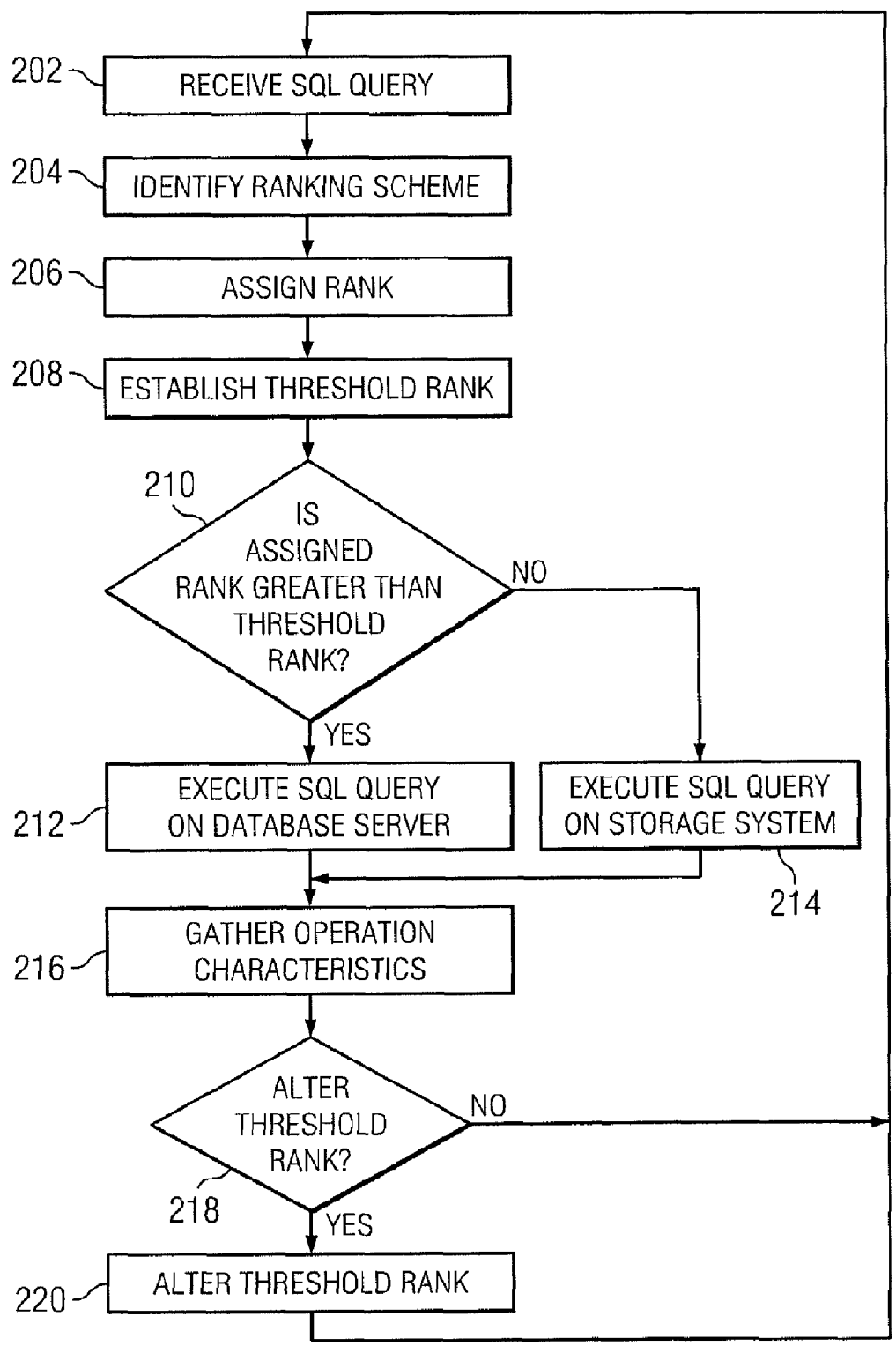
FIG. 2 illustrates a flow chart of an example method for load balancing SQL query execution between database server and storage system, in accordance with certain embodiments of the present disclosure.

FIG. 2 illustrates a flow chart of an example method 200 for load balancing SQL query execution between database server 102 and storage system 104, in accordance with certain embodiments of the present disclosure. Method 200 includes establishing a ranking system, assigning a rank to an SQL query, determining a threshold rank value based on monitored operational characteristics, comparing the rank to the threshold rank, and executing the SQL query on either database server 102 or storage system 104 depending on whether the compared rank is higher or lower than the threshold rank.

According to one embodiment, method 200 preferably begins at step 202. Teachings of the present disclosure may be implemented in a variety of configurations of information handling system 100. As such, the preferred initialization point for method 200 and the order of steps 202-220 comprising method 200 may depend on the implementation chosen.

At step 202, database server 102 receives an SQL query from a user. After receiving the SQL query, method 200 may proceed to step 204. At step 204, information handling system 100 establishes or identifies a preexisting ranking scheme for an incoming SQL query. In some embodiments, there may be more than one preexisting ranking scheme, with each ranking scheme ascribed to a particular type of SQL query, as described in more detail below with reference to FIGS. 3-5. After establishing or identifying the appropriate ranking scheme for the SQL query under consideration, method 200 may proceed to step 206.

At step 206, database server 102 may assign a rank to the SQL query. In some embodiments, the rank may be based on certain properties of the SQL query, as described in more detail below with reference to FIGS. 3-5. For instance, if the SQL query requires the use of an index scan, then load balancing module 106 of database server 102 may assign the highest rank value in the ranking scheme to the SQL query. In another example, an SQL query may be assigned a rank based on an estimated ratio of the number of rows resulting from the SQL query to the number of rows of database 112 required to be read in order to execute the SQL query. The assigning of a rank to the SQL query is described in more detail below with reference to FIGS. 3-5. After assigning the rank to the SQL query, method 200 may proceed to step 208.

At step 208, load balancing module 106 may establish a threshold rank from the ranking scheme. This threshold rank may be used later to determine whether the SQL query is executed on database server 102 or storage system 104. After determining this threshold rank, method 200 may proceed to step 210.

At step 210, load balancing module 210 may compare the rank(s) to the threshold rank(s) established in step 208 to determine whether the SQL query will be executed on database server 102 or storage system 104. In some embodiments, if the rank assigned to the SQL query is above the threshold rank, then the SQL query may be executed on database server 102 at step 212. If the rank is not above the threshold rank, then database server 102 may communicate the SQL query to storage system 104 for execution by SQL query execution engine 110 at step 214. After executing the SQL query at either step 212 or step 214, method 200 may proceed to step 216.

At step 216, load balancing module 106 may gather certain operational characteristics of information handling system 100. In some embodiments, these characteristics include the current CPU usage of database server 102, current CPU usage of storage system 104, and the network load level of the communication link between database server 102 and storage system 104. In other embodiments, load balancing module 106 may gather other operational characteristics of information handling system 100 that may bear on the appropriate load balancing of SQL query execution between database server 102 and storage system 104. After gathering the appropriate data, method 200 may proceed to step 218.

At step 218, load balancing module 106 may determine whether, based on the gathered operational characteristics of information handling system 100, the threshold rank should be altered. For instance, if the CPU usage of database server 102 is currently running at an unacceptably high level (e.g., greater than 80%), then it may be desirable to modify the threshold rank such that fewer SQL queries are executed on database server 102. If the determination is made that the threshold rank should be altered, method 200 may proceed to step 220, wherein the threshold rank is incremented or decremented as appropriate. In other examples, it may be desirable to execute more SQL queries on SQL query execution engine 108 of database server 102 if the CPU usage of storage system 104 is unacceptably high (e.g., greater than 80%) or if the load on the communication link is unacceptably high (e.g., greater than 80%). In further examples, the determination to alter the threshold rank may be based on whether the gathered operational characteristics are too low, or on some combination of the above examples.

After this alteration, method 200 may terminate and return to step 202. If no alteration is required, method 200 may terminate and return to step 202.

Although FIG. 2 discloses a particular number of steps to be taken with respect to method 200, method 200 may be executed with more or fewer steps than those depicted in FIG. 2. In addition, although FIG. 2 discloses a certain order of steps comprising method 200, the steps comprising method 200 may be completed in any suitable order. For example, in the embodiment of method 200 shown, the gathering of operational characteristics shown in step 216 does not occur until after the rank is assigned to the SQL query. However, in some configurations it may be desirable to continuously monitor the relevant operational characteristics and make adjustments to the threshold rank(s) as that monitoring occurs rather than waiting for an SQL query to arrive.

Figure 3:
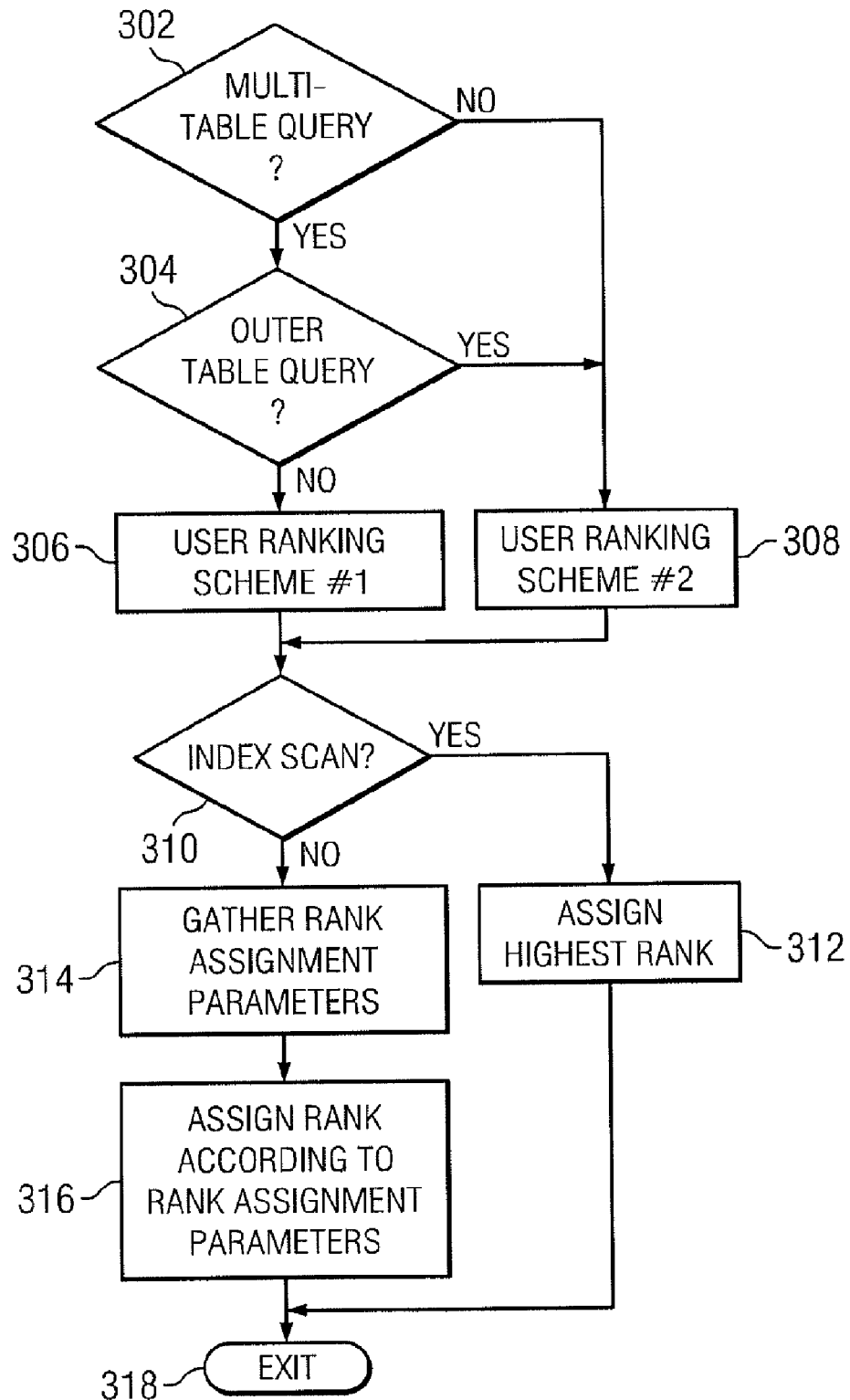
FIG. 3 illustrates a flow chart of an example method for assigning a rank to an SQL query, in accordance with certain embodiments of the present disclosure.

FIG. 3 illustrates a flow chart of an example method 300 for assigning a rank to an SQL query, in accordance with certain embodiments of the present disclosure. Thus, method 300 corresponds generally with step 206 of method 200 shown in FIG. 2. FIG. 3 is intended to more clearly describe assigning a rank to an SQL query in a configuration in which multiple ranking schemes are available to load balancing module 106 of database server 102. As described in more detail above with reference to FIG. 1, an SQL query may be either a single table or a multi-table query. In some embodiments, the ranking scheme appropriate for a single table query may not be appropriate for all of the nested queries in a multi-table query. In example method 300, two ranking schemes are used, one for single table queries and the outer table queries of multi-table queries, and another for an inner table query of a multi-table query. However, in some embodiments, it may be necessary or desirable to have more or fewer ranking schemes. Illustrative embodiments of these two ranking schemes are described in more detail below with reference to FIGS. 4-5.

At step 302, method 300 determines whether the SQL query under consideration is a multi-table query. If it is, then method 300 may determine, at step 304, whether the query under consideration is an outer table query. If it is not, then method 300 may proceed to step 306. If it is, the method 300 may proceed to step 308. If, at method 302, method 300 determined that the query under consideration is not a multi-table query (that is, it is a single table query), then method 300 may proceed to step 308.

At step 306, method 300 may refer to a first ranking scheme. In the example embodiment, the first ranking scheme is used if the SQL query under consideration is an inner table query of a multi-table query. In some embodiments, this first ranking scheme may be a ranking scheme such as the one described in more detail below with reference to FIG. 5. After identifying the first ranking scheme, method 300 may proceed to step 310.

Referring again to step 308, method 300 may refer to a second ranking scheme. In the example embodiment, the second ranking scheme is used if the SQL query under consideration is either a single table query or the outer table query of a multi-tale query. In some embodiments, this second ranking scheme may be a ranking scheme such as the one described in more detail below with reference to FIG. 4. After identifying the second ranking scheme, method 300 may proceed to step 310.

At step 310, method 300 may determine whether the SQL query under consideration makes use of an index scan. If it does, then method 300 may proceed to step 312, where method 300 may assign the highest rank of the ranking scheme being used to the SQL query. For example, if the first ranking scheme used is that illustrated in FIG. 5, then method 300 may assign a rank of eight to the SQL query. In another example, if the second ranking scheme used is that illustrated in FIG. 4, then method 300 may assign a rank of eight to the SQL query. After assigning the highest rank to a SQL query using an index scan, method 300 may proceed to step 318 and terminate. If the SQL query under consideration does not make use of an index scan, then method 300 may proceed to step 314.

At step 314, method 300 may gather the rank assignment parameters relevant to the ranking scheme. For example, if the first ranking scheme is used and that first ranking scheme is the one illustrated in FIG. 5, then method 300 may determine the number of rows resulting from the execution of the outer table query corresponding to this multi-table query. In another example, if the second ranking scheme is used and that second ranking scheme is that illustrated in FIG. 4, then method 300 may determine the estimated ratio of the number of rows resulting from the SQL query to the number of rows required to be read in order to execute the SQL query. After gathering the relevant rank assignment parameters, method 300 may proceed to step 316.

At step 316, method 300 may assign a rank corresponding to the gathered rank assignment parameters according to the ranking scheme. For example, if the first ranking scheme is used and that first ranking scheme is the one illustrated in FIG. 5, and method 300 determined in step 314 that the number of rows resulting from the execution of the outer table query corresponding to this multi-table query was 1,300, then method 300 may assign a rank of five to the SQL query under consideration. In another example, if the second ranking scheme is used and that second ranking scheme is the one illustrated in FIG. 3, and method 300 determined in step 314 that the estimated ratio of the number of rows resulting from the SQL query to the number of rows required to be read in order to execute the SQl query was 0.03, then method 300 may assign a rank of seven to the SQL query under consideration. After assigning the rank to the SQL query, method 300 may proceed to step 318 and terminate.

Although FIG. 3 discloses a particular number of steps to be taken with respect to method 300, method 300 may be executed with more or fewer steps than those depicted in FIG. 3. In addition, although FIG. 3 discloses a certain order of steps comprising method 300, the steps comprising method 300 may be completed in any suitable order.

FIG. 4 illustrates an example ranking scheme 400 for load balancing SQL queries between database server 102 and storage system 104, in accordance with certain embodiments of the present disclosure. In some embodiments, ranking scheme 400 may be used to assign a rank to a single table SQL query or to the outer table query of a multi-table SQL query, as described above with reference to FIG. 3. Ranking scheme 400 includes a plurality of ranks 402 and a corresponding plurality of rank assignment parameters 404. In the example embodiment, ranking scheme 400 includes eight ranks 402, numbered one through eight. However, ranking scheme 400 may include more or fewer ranks, depending on the granularity desired by a particular configuration.

Rank assignment parameters 404 may be any characteristic of the SQL query appropriate to accurate load balancing. In some embodiments, rank assignment parameters 404 are ratios of the number of rows that may result from the SQL query to the number of database rows needed to be scanned in order to execute the SQL query. This ratio may be estimated by examining the metadata of the SQL query and the target database by known methods. While such estimates may not be wholly accurate, they may be sufficient for the purposes of load balancing. In the example embodiment, the lowest rank 402, rank one, is assigned to the smallest rank parameter value 404, a ratio of less than or equal to 0.0000001. Increments in the value of the ratio calculated for rank assignment parameters 404 are assigned to increasing ranks 402.

FIG. 5 illustrates an example ranking scheme 500 for load balancing SQL queries between database server 102 and storage system 105, in accordance with certain embodiments of the present disclosure. In some embodiments, ranking scheme 500 may be used to assign a rank to an inner table query of a multi-table SQL query, as described above with reference to FIG. 3. Ranking scheme 500 includes a plurality of ranks 502 and a corresponding plurality of rank assignment parameters 504. In the example embodiment, ranking scheme 500 includes eight ranks 502, numbered one through eight. However, ranking scheme 500 may include more or fewer ranks, depending on the granularity desired by a particular configuration.

Rank assignment parameters 504 may be any characteristic of the SQL query appropriate to accurate load balancing. In some embodiments, rank assignment parameters 504 are the number of rows resulting from the outer table query of the SQL query. In the example embodiment, the lowest rank 502, rank one, is assigned to the smallest rank parameter value 504, wherein the number of rows resulting from the outer table query is greater than or equal to 100,000,000. Increments in the number of rows returned from the outer table query are assigned to increasing ranks 302.

FIGS. 4 and 5 illustrate examples of ranking schemes configured to assign a rank to a SQL query in order to determine the appropriate location for executing the SQL query. However, other ranking schemes are possible without departing from the teachings of this disclosure. For instance, a ranking scheme may be used that maps a rank based on the length of the query itself or the database table to which the query is directed.

Using the methods and systems disclosed herein, certain problems associated with load balancing the execution of SQL queries in an information handling system may be improved, reduced, or eliminated. For example, the methods and systems disclosed herein allow for the dynamic adjusting of criteria used to determine whether an SQL query will be executed on a database server or on a centralized storage system. In addition, to appropriately manage this load balancing, operational characteristics of the information handling system may be continuously monitored so as to provide the most appropriate load balancing thresholds.

Although the present disclosure has been described in detail, it should be understood that various changes, substitutions, and alterations can be made hereto without departing from the spirit and the scope of the disclosure as defined by the appended claims.

What is claimed is:

1. A method for allocating the execution of a database query in a system comprising a database server and a storage system communicatively coupled to the database server via a communication network, comprising:
- establishing a ranking scheme comprising a plurality of rank values;
- assigning a first rank from the plurality of rank values to the database query, comprising:
  - determining whether the database query comprises at least an outer table query and an inner table query;
  - if the database query comprises at least an outer table query and an inner table query, assigning the first rank to an outer table query of the database query and assigning a second rank to the inner table query of the database query;
- determining a threshold rank from the plurality of rank values;
- comparing the first rank to the threshold rank;
- if the first rank is greater than the threshold rank, communicating the database query to the database server for execution; and
- if the first rank is not greater than the threshold rank, communicating the database query to the storage system for execution.

2. The method of claim 1, wherein assigning the second rank to the inner table query of the database query comprises:
- determining whether the inner table query uses an index scan; and
- if the inner query uses an index scan, assigning the highest value in the ranking scheme to be the value of the second rank; and
- if the inner query does not use an index scan, assigning the second rank from a second plurality of rank values, wherein the second plurality of rank values are based at least on the number of rows resulting from the outer query of the database query.

3. A system for allocating the execution of a database query between a database server and a storage system coupled to the database server via a communication network, comprising a load balancing module communicatively coupled to the database server, the load balancing module configured to:
- establish a ranking scheme comprising a plurality of rank values;
- assign a first rank from the plurality of rank values to the database query;
- determine whether the database query comprises at least an outer table query and an inner table query;
- if the database query comprises at least an outer table query and an inner table query, assign the first rank to an outer table query of the database query and assign a second rank to the inner table query of the database query;
- determine a threshold rank from the plurality of rank values;
- compare the first rank to the threshold rank; and
- if the first rank is greater than the threshold rank, communicate the database query to the database server for execution; and
- if the first rank is not greater than the threshold rank, communicate the database query to the storage system for execution.

4. The system of claim 3, wherein the load balancing module is further configured to:
- determine whether the inner table query uses an index scan; and
- if the inner query uses an index scan, assign the highest value in the ranking scheme to be the value of the second rank; and
- if the inner query does not use an index scan, assign the second rank from a second plurality of rank values, wherein the second plurality of rank values are based at least on the number of rows resulting from the outer query of the database query.

* * * * *